United States Patent
Yeo et al.

(10) Patent No.: US 10,641,878 B2
(45) Date of Patent: May 5, 2020

(54) POSITIONAL FEEDBACK SENSING USEFUL FOR AUTOMATED VEHICLE LIDAR

(71) Applicant: Aptiv Technologies Limited, St. Michael (BB)

(72) Inventors: Kok Wee Yeo, Singapore (SG); Yew Kwang Low, Singapore (SG); Chee Keng Yeo, Singapore (SG)

(73) Assignee: Aptiv Technologies Limited (BB)

( * ) Notice: Subject to any disclaimer, the term of this patent is extended or adjusted under 35 U.S.C. 154(b) by 694 days.

(21) Appl. No.: 15/233,660

(22) Filed: Aug. 10, 2016

(65) Prior Publication Data

US 2018/0045817 A1  Feb. 15, 2018

(51) Int. Cl.
| | | |
|---|---|---|
| *G01S 7/497* | (2006.01) | |
| *G01S 7/481* | (2006.01) | |
| *G01S 17/42* | (2006.01) | |
| *G01S 17/93* | (2020.01) | |

(52) U.S. Cl.
CPC .......... *G01S 7/4972* (2013.01); *G01S 7/4814* (2013.01); *G01S 7/4817* (2013.01); *G01S 7/497* (2013.01); *G01S 17/42* (2013.01); *G01S 17/936* (2013.01)

(58) Field of Classification Search
CPC .... G01S 7/4972; G01S 7/4814; G01S 7/4817; G01S 7/497; G01S 17/42; G01S 17/936
USPC ................................. 356/3.01–5.15
See application file for complete search history.

(56) References Cited

U.S. PATENT DOCUMENTS

| | | | |
|---|---|---|---|
| 6,300,896 B1 | 10/2001 | Kull et al. | |
| 6,356,229 B1 | 3/2002 | Schneider | |
| 6,522,445 B1 | 2/2003 | Kleytman | |
| 2002/0025096 A1* | 2/2002 | Wang | G02B 27/09 385/8 |
| 2003/0034913 A1 | 2/2003 | Asanuma et al. | |
| 2005/0175362 A1* | 8/2005 | Wilson | G01J 3/02 398/212 |
| 2007/0115169 A1 | 5/2007 | Kai et al. | |
| 2010/0103431 A1* | 4/2010 | Demopoulos | B25J 9/1692 356/622 |
| 2015/0005993 A1 | 1/2015 | Breuing | |
| 2015/0200165 A1* | 7/2015 | Shiba | H01L 21/3086 438/401 |
| 2015/0301182 A1* | 10/2015 | Geiger | G01S 17/026 250/201.1 |

(Continued)

FOREIGN PATENT DOCUMENTS

| | | |
|---|---|---|
| DE | 10 2015 012 246 A1 | 3/2016 |
| DE | 10 2014 223 461 A1 | 5/2016 |
| JP | 3189711 B2 | 7/2001 |

*Primary Examiner* — Luke D Ratcliffe
(74) *Attorney, Agent, or Firm* — Joseph V. Bonadies

(57) ABSTRACT

An illustrative example device for controlling a direction of radiation includes a source of at least one beam of radiation. A plurality of optical components in a pathway of the at least one beam of radiation establish a first direction of the at least one beam of radiation. The plurality of optical components includes at least one adjustable optical component that includes at least one portion that is moveable relative to the source. A positional feedback feature on a portion of at least one of the optical components deflects at least some of the at least one beam of radiation in a second direction that is different than the first direction. A detector is situated to detect at least some of the deflected radiation and provides an output indicative of the first direction.

15 Claims, 4 Drawing Sheets

(56) References Cited

U.S. PATENT DOCUMENTS

2016/0182892 A1* 6/2016 Ko .................... G01S 17/89
   348/46
2018/0181067 A1* 6/2018 Hasedzic ............ B60Q 9/008

* cited by examiner

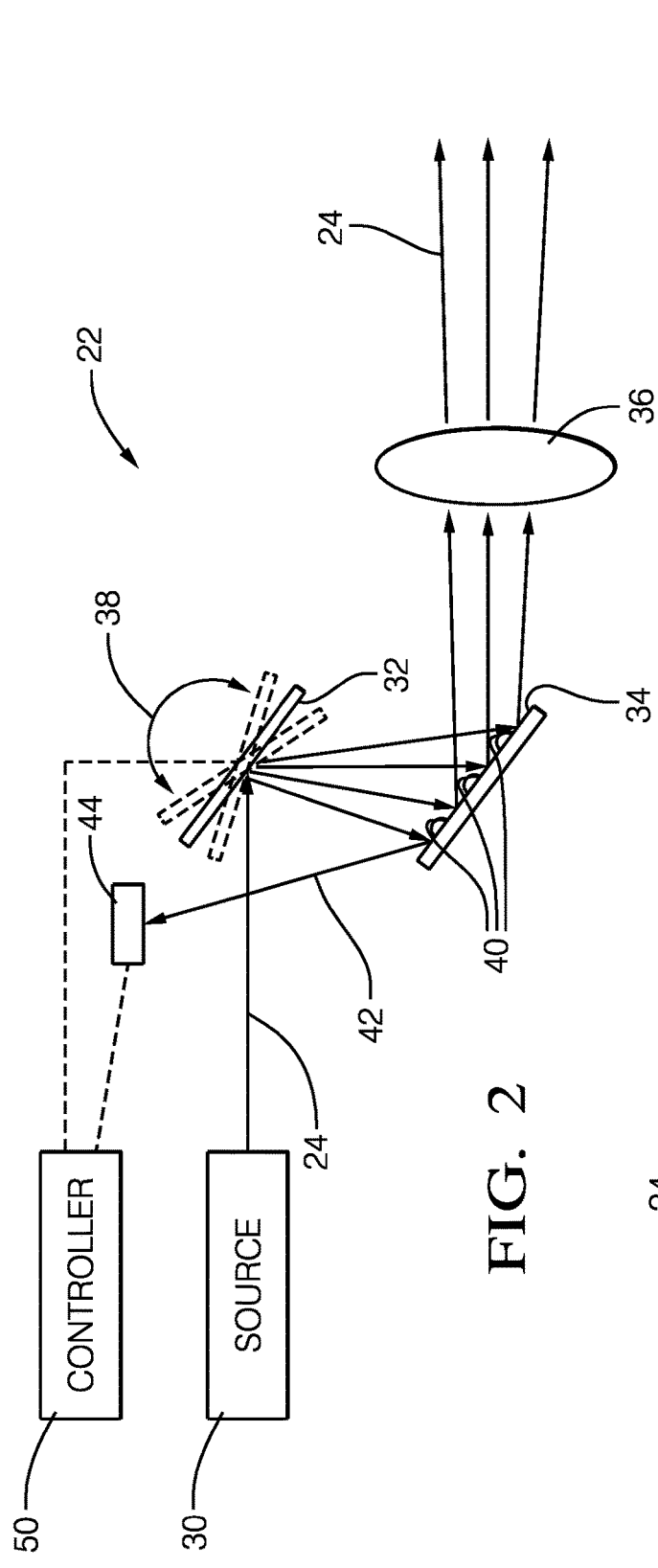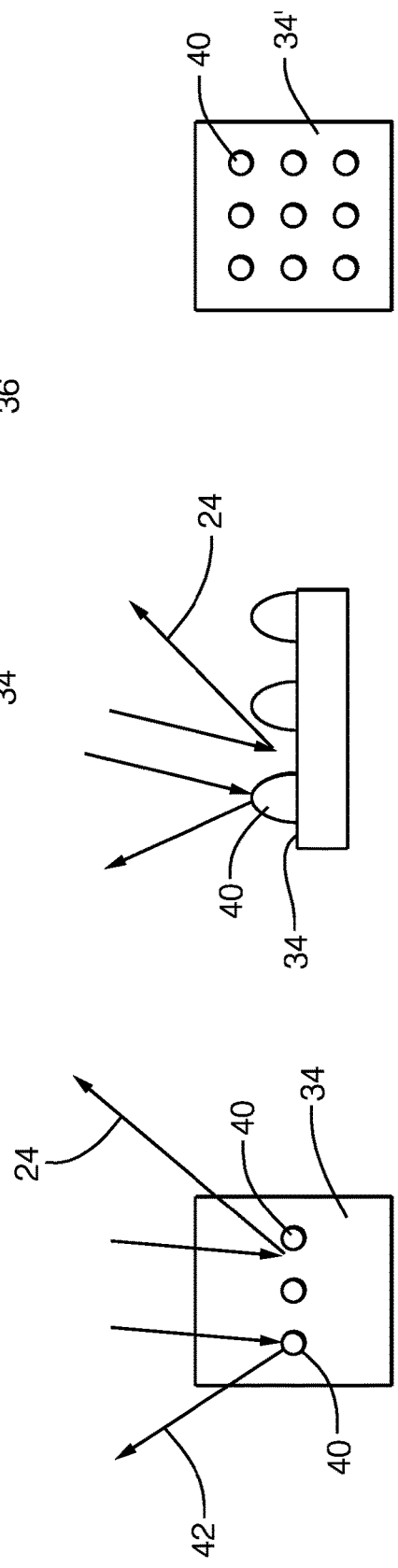

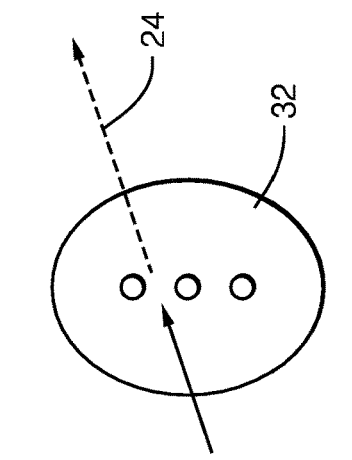
FIG. 7
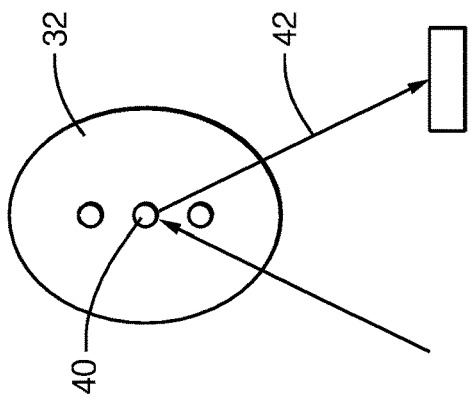
FIG. 9
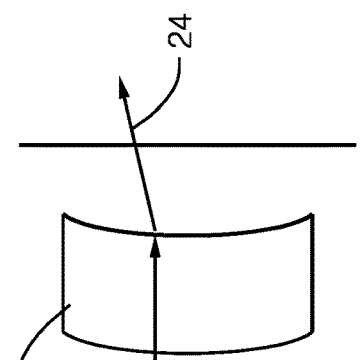
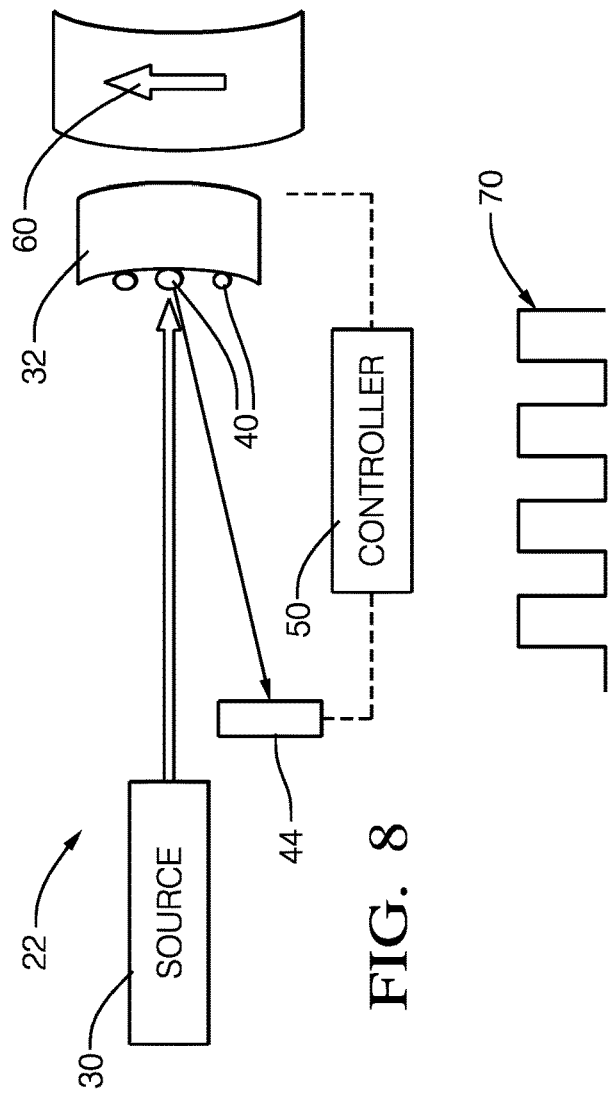
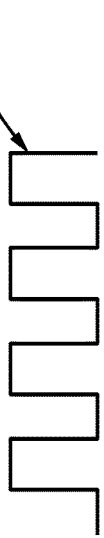
FIG. 10

POSITIONAL FEEDBACK SENSING USEFUL FOR AUTOMATED VEHICLE LIDAR

BACKGROUND

Advances in electronics and technology have made it possible to incorporate a variety of advanced features on automotive vehicles. Various sensing technologies have been developed for detecting objects in a vicinity or pathway of a vehicle. Such systems are useful for parking assist and cruise control adjustment features, for example.

More recently, automated vehicle features have become possible to allow for autonomous or semi-autonomous vehicle control. For example, cruise control systems may incorporate LIDAR (light detection and ranging) for detecting an object or another vehicle in the pathway of the vehicle. Depending on the approach speed, the cruise control setting may be automatically adjusted to reduce the speed of the vehicle based on detecting another vehicle in the pathway of the vehicle.

There are different types of LIDAR systems. Flash LIDAR relies upon a single laser source to illuminate an area of interest. Reflected light from an object is detected by an avalanche photodiode array. While such systems provide useful information, the avalanche photodiode array introduces additional cost because it is a relatively expensive component. Additionally, the laser source for such systems has to be relatively high power to achieve sufficiently uniform illumination of the area of interest. Scanning LIDAR systems utilize different components compared to flash LIDAR. One challenge associated with previously proposed scanning LIDAR systems is that additional space is required for the scanning components, such as a mirror array, and there is limited packaging space available on vehicles. Optical phase array LIDAR systems utilize beam multiplexing that tends to introduce relatively significant power loss.

There is a need for improvements in components for systems, such as LIDAR systems, that are lower-cost, easier to fit within small packaging constraints, and utilize power efficiently. For example, micro-electro-mechanical (MEMs) mirror arrays are typically open loop devices that do not have accurate position feedback information. Without such information precise control over a beam direction can be difficult and the range of the scanning angle is limited. Previous attempts to include position feedback capabilities have introduced complexities, additional components and increased cost, all of which are undesirable when tight packaging constraints and cost are concerns.

SUMMARY

An illustrative example device for controlling a direction of radiation includes a source of at least one beam of radiation. A plurality of optical components in a pathway of the at least one beam of radiation establish a first direction of the at least one beam of radiation. The plurality of optical components includes at least one adjustable optical component that includes at least one portion that is moveable relative to the source. A positional feedback feature on a portion of at least one of the optical components deflects at least some of the at least one beam of radiation in a second direction that is different than the first direction. A detector is situated to detect at least some of the deflected radiation and provides an output indicative of the first direction.

An example embodiment having one or more features of the device of the previous paragraph includes a controller that is configured to control the at least one adjustable optical component based at least in part on the output of the detector.

In an example embodiment having one or more features of the device of either of the previous paragraphs, the positional feedback feature comprises a nanoscale reflective surface.

In an example embodiment having one or more features of the device of any of the previous paragraphs, the positional feedback feature comprises a nanoscale refractive surface.

In an example embodiment having one or more features of the device of any of the previous paragraphs, the positional feedback feature comprises a nanoscale grating on the portion of the at least one of the optical components.

In an example embodiment having one or more features of the device of any of the previous paragraphs, the positional feedback feature comprises at least one hemispherical deflecting surface on the at least one of the optical components.

In an example embodiment having one or more features of the device of any of the previous paragraphs, the positional feedback feature comprises a plurality of hemispherical deflecting surfaces arranged in a selected pattern on the at least one of the optical components.

In an example embodiment having one or more features of the device of any of the previous paragraphs, the plurality of optical components includes a micro-electrical-mechanical (MEM) mirror array and the output of the detector is indicative of a position of at least one of the mirrors of the array.

In an example embodiment having one or more features of the device of any of the previous paragraphs, the plurality of optical components includes at least one stationary optical component that remains stationary relative to the source and the stationary optical component is at least one of a reflective surface, a refractive surface, a lens and a window.

In an example embodiment having one or more features of the device of any of the previous paragraphs, the radiation comprises light.

An illustrative example method facilitates monitoring a device that directs radiation. The device includes a source of at least one beam of radiation, a plurality of optical components including at least one adjustable optical component that includes at least one portion that is moveable relative to the source, and a positional feedback feature on a portion of at least one of the optical components. The method includes establishing a first direction of the at least one beam of radiation including selectively positioning the at portion of the least one adjustable optical component, deflecting at least some of the at least one beam of radiation from the positional feedback feature in a second direction that is different than the first direction, detecting at least some of the deflected radiation, and determining the first direction based on the detecting.

An example embodiment having one or more features of the method of the previous paragraph includes providing information regarding the detecting to a controller and using the controller to control the position of the portion of the at least one adjustable optical component based at least in part on the information.

In an example embodiment having one or more features of the method of either of the previous paragraphs, the positional feedback feature comprises at least one of a nanoscale reflective surface, a nanoscale refractive surface, and a nanoscale grating on the portion of the at least one of the optical components.

In an example embodiment having one or more features of the method of any of the previous paragraphs, the positional feedback feature comprises at least one hemispherical deflecting surface on the at least one of the optical components.

In an example embodiment having one or more features of the method of any of the previous paragraphs, the plurality of optical components includes a micro-electrical-mechanical (MEM) mirror array and the determining includes determining a position of at least one of the mirrors of the array.

In an example embodiment having one or more features of the method of any of the previous paragraphs, the radiation comprises light.

An illustrative example LIDAR device for use on an automated vehicle includes a source of at least one beam of light. A plurality of optical components in a pathway of the at least one beam of light establishes a first direction of the at least one beam of light. The plurality of optical components includes at least one adjustable optical component that includes at least one portion that is moveable relative to the source. A positional feedback feature on a portion of at least one of the optical components deflects at least some of the at least one beam of light in a second direction that is different than the first direction. A detector situated to detect at least some of the deflected light provides an output indicative of the first direction.

An example embodiment having one or more features of the device of the previous paragraph includes a controller that is configured to control movement of the portion of the at least one adjustable optical component based at least in part on the output of the detector.

In an example embodiment having one or more features of the device of either of the previous paragraphs, the positional feedback feature comprises at least one of a nanoscale reflective surface, a nanoscale refractive surface, and a nanoscale grating on the portion of the at least one of the optical components.

In an example embodiment having one or more features of the device of any of the previous paragraphs, the positional feedback feature comprises at least one hemispherical deflecting surface on the at least one of the optical components.

In an example embodiment having one or more features of the device of any of the previous paragraphs, the plurality of optical components includes a micro-electrical-mechanical (MEM) mirror array and the output of the detector is indicative of a position of at least one of the mirrors of the array.

Various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 2 schematically illustrates an example device for steering radiation designed according to an embodiment of this invention.

FIG. 3 schematically illustrates selected portions of the example device of FIG. 2 including an example positional feedback feature pattern from a first perspective.

FIG. 4 schematically illustrates the portions shown in FIG. 3 from a second perspective.

FIG. 5 schematically illustrates an example positional feedback feature pattern according to another embodiment.

FIG. 6 schematically illustrates another example device for steering radiation designed according to another embodiment of this invention.

FIG. 7 illustrates selected portions of the embodiment of FIG. 6 in a first operative condition.

FIG. 8 shows the example of FIG. 6 in another operative condition.

FIG. 9 corresponds to the illustration of FIG. 7 but shows the same portions in the operative condition of FIG. 8.

FIG. 10 illustrates an example detector output.

DETAILED DESCRIPTION

Figure 1:
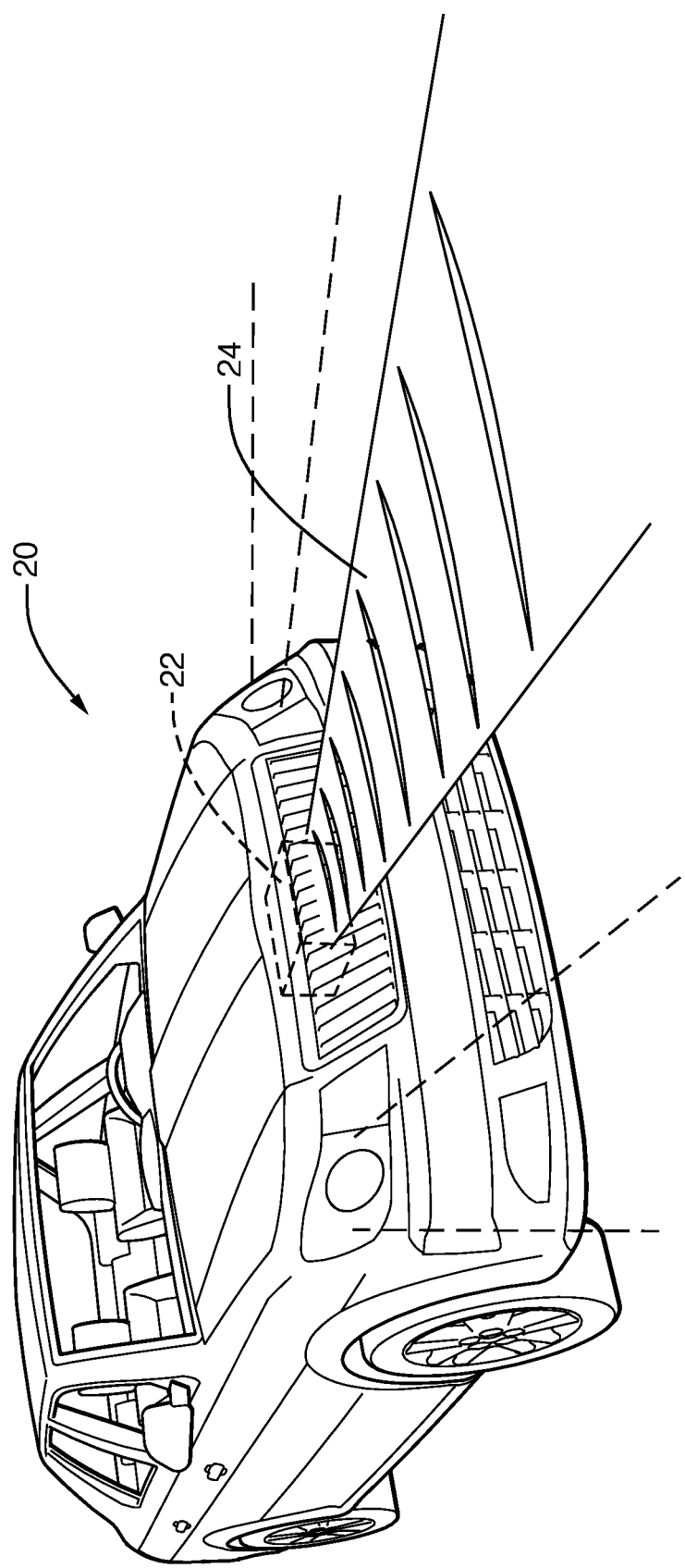
FIG. 1 schematically illustrates a vehicle including a detection device having beam steering components designed according to an embodiment of this invention.

FIG. 1 schematically illustrates a vehicle 20 including a detection device 22. One example use for the detection device 22 is to provide sensing or guidance information for a vehicle, engine or brake controller, such as an automated vehicle controller. For discussion purposes, the detection device 22 is a LIDAR device that emits at least one beam of radiation 24 that is useful for detecting objects in a vicinity or pathway of the vehicle 20. In this example, the beam of radiation 24 comprises light that is directed at a selected angle relative to the vehicle 20.

Embodiments of this invention include feedback information that provides more precise control over beam scanning components, additional beam steering control and enhanced scanning capability. The feedback information is obtained from at least one positional feedback feature on an optical component without introducing complexities, requiring additional space, or additional cost.

Selected portions of an illustrative example embodiment of the device 22 is schematically shown in FIG. 2. In this example the device 22 includes a source of radiation 30 that emits at least one beam 24 of radiation. In this example, the source 30 comprises at least one laser diode and the radiation comprises light. Other sources and types of radiation may be useful in some embodiments and those skilled in the art who have the benefit of this description will realize what type of source 30 will best suit their particular needs.

The device 22 includes a plurality of optical components 32, 34 and 36 that are in a pathway of the beam 24. The optical components 32-36 steer or direct the beam 24 in a first, desired direction.

At least one of the plurality of optical components is an adjustable optical component that includes at least one portion that is moveable relative to the source 30 for changing the direction of the beam 24. In this example, the optical component 32 is the adjustable optical component and the entire reflective optical surface of the optical component 32 is moveable as schematically represented by the arrow 38. In some examples, the adjustable optical component is one or more mirrors of a micro-electro-mechanical (MEMs) mirror array. In other examples, the adjustable optical component is one or more surfaces on an optical component that is part of a phased optic array device that has controllable surface elements that may be adjusted to achieve beam steering. Phased array optics devices allow for adjustment without having moving parts.

For discussion purposes the entire adjustable optical component is described as moveable in the rest of this description but those skilled in the art will realize that an adjustable optical component used in an embodiment of this invention may be adjustable in another manner, such as the way in which phased optics array devices are adjustable. In other words, when an adjustable optical component is described as being moved or moveable in this description that should be understood to include embodiments in which the entire component is moveable or at least a surface or portion of a surface of the adjustable component is moveable. Similarly, statements that a portion of a component is adjustable or moveable should be understood to include embodiments in which the entire component is adjustable or moveable.

In the illustrated example, the optical components 34 and 36 are stationary optical components that respectively remain stationary relative to the source 30. In this example, the stationary optical component 34 has a reflective surface, such as a mirror, and the stationary optical component 36 is a lens or a window.

At least one of the optical components 32-36 has at least one positional feedback feature 40 on at least one portion of the component. The positional feedback feature 40 in this example is on the optical component 34 on a surface of that component that reflects the radiation beam 24. The positional feedback feature 40 deflects at least a portion of the radiation from the source 30 in a second direction that is different than the first direction of the beam 24. Radiation that is deflected from the positional feedback feature 40 is schematically shown at 42 in FIGS. 2, 3 and 4. Radiation incident on the optical component 34 that does not reach the positional feedback feature 40 will be directed in the first direction of the beam 24 and radiation incident the positional feedback feature 40 will be deflected in the second, different direction as schematically shown at 42 in FIGS. 3 and 4.

The positional feedback feature 40 in this example comprises a nanoscale deflective surface on a surface of the optical component 34. The positional feedback feature 40 may be realized using a known nanoimprinting technique. In some examples the positional feedback feature comprises a nanoscale grating.

As can be appreciated from FIGS. 3 and 4, the positional feedback feature 40 in this example comprises a plurality of hemispherical surfaces on at least one surface of the optical component 34. The surfaces of the positional feedback feature 40 are arranged in a selected pattern so that at least some of the radiation (e.g., light) from the source 30 is deflected by the positional feedback feature 40 when the adjustable optical component 32 is in a corresponding position. The optical component 34 includes a pattern like that shown in FIG. 3 to provide position information in one dimension. FIG. 5 shows another example pattern for the positional feedback feature 40 on an optical component 34' to provide position feedback information in two dimensions.

The device 22 includes at least one detector 44 situated relative to the optical components 32-26 or the source 30 where the detector 44 can detect at least some deflected radiation 42 from the positional feedback feature 40. The detector 44 in one example embodiment comprises a photodiode.

The detector 44 provides an output that is indicative of any detected deflected radiation 42 to a controller 50. The detector output is useful to the controller 50 for determining the first direction of the beam 24. Whether the detector 44 detects and deflected radiation depends on a position (e.g., location, orientation, etc.) of the adjustable optical component 32. There is a predetermined or selected relationship between the position of the adjustable optical component 32 and the first direction of the beam 24. There also is a predetermined or selected relationship between the location of the positional feedback feature 40 and the position of the adjustable optical component 32.

The controller 50 is configured, such as through programming or design, to determine the direction of the beam 24 based on the feedback information provided by the detector 44. The output of the detector 44 is based on the position of the adjustable optical component 32 and that position has a predetermined relationship with the beam direction. Those relationships and the indication or information provided by the detector 44 allows the controller 50 to determine the direction of the beam 24.

The controller 50 in this example includes at least one computing device or processor and memory associated with the processor or computing device. The memory includes programming that makes the controller 50 configured to make beam direction or position determinations based on the output of the detector 44. The memory also at least temporarily stores information regarding determined position information for control purposes so that the controller 50 may make adjustments to the operation of the device 22 to realize a desired function or performance.

The controller 50 in the illustrated example controls the position of the adjustable optical component 32 based on preselected programming and selectively adjusts such control based on positional feedback information available from the positional feedback feature 40 and the detector 44. For example, the controller 50 in some embodiments recalibrates the position or control of the adjustable optical component based on the feedback information from the detector output.

FIGS. 6-9 illustrate another example configuration of the device 22. In this example the optical components 32 and 34 are both moveable and each comprises a refractive component, such as a lens. In FIG. 6, the positional feedback feature 40 is on the optical component 32 and comprises a plurality of nanoscale, hemispherical deflecting surfaces or a nanoscale grating that is refractive.

In a first operative condition shown in FIGS. 6 and 7, the beam 24 passes through the optical component 32 without any portion of the beam reaching the positional feedback feature 40. In this first operative condition the detector 44 does not detect any deflected radiation. In a second operative condition shown in FIGS. 8 and 9 the optical components 32 and 34 have been moved as schematically shown by the arrow 60. The controller 50 controls an actuator (not shown) to cause desired movement of the optical components 32 and 34 to achieve a scanning pattern of the beam 24, for example.

In the second operative condition, the beam 24 is incident upon and deflected by the positional feedback feature 40 so that some or all of the radiation is deflected at 42 and detected by the detector 44. The detector 44 provides a different output for the first and second conditions, respectively, and the controller 50 determines a position of the adjustable optical components 32 and 34, which corresponds to a position or direction of the beam 24, based on the detector output. The controller 50 may use such feedback position information for adjusting the operation of the device 22 if needed or desired.

FIG. 10 schematically illustrates an example output 70 from one embodiment of the detector 44. In this example, the detector 44 effectively provides an optical encoder output to track the position of the adjustable optical component and, therefore, the direction of the beam 24. When the detector 44 detects any of the deflected radiation 42 the output is high and when no radiation is incident on the detector 44 the output is low.

Figure 11:
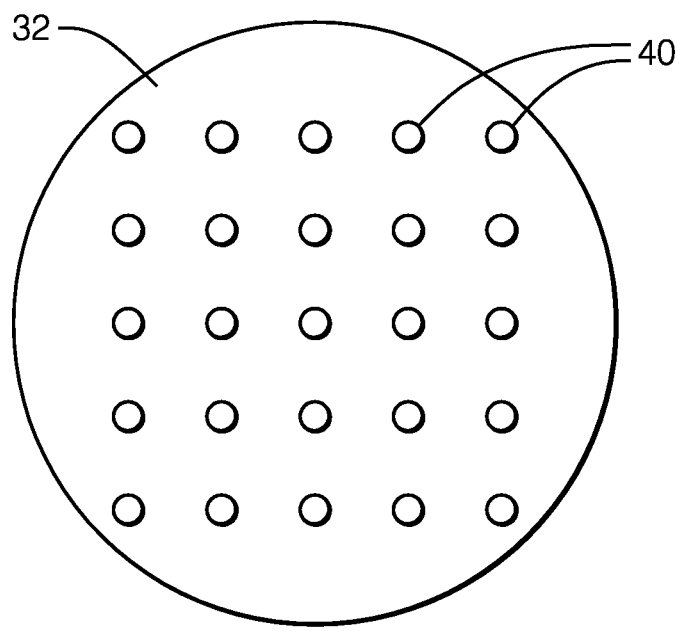
FIG. 11 schematically illustrates an example pattern of a positional feedback feature on an optical component.
Figure 12:
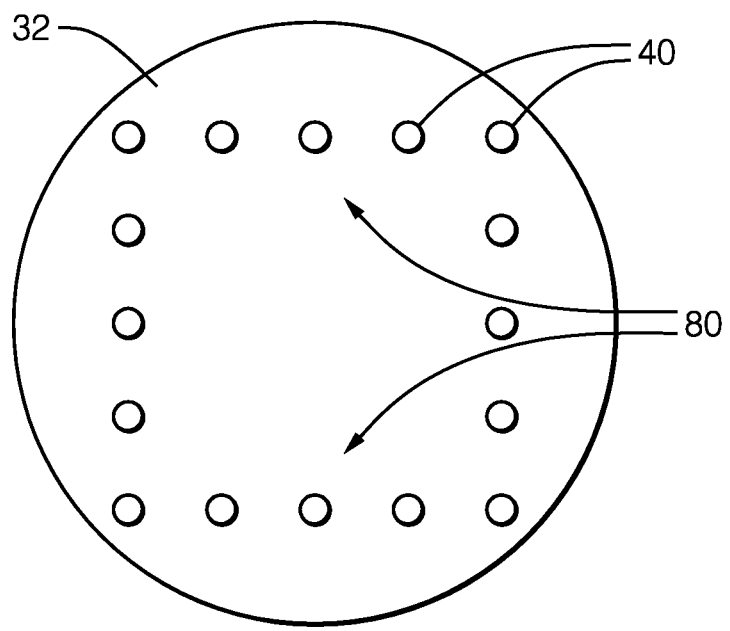
FIG. 12 schematically illustrates another example positional feedback feature pattern.

In some examples, the pattern of the positional feedback feature 40 is such that some radiation may be deflected under most operative conditions of the device 22. One such pattern is shown on a surface of an optical component 32, such as a lens, mirror or window in FIG. 11. Another pattern is schematically shown in FIG. 12 that includes a portion of the optical component 32 uninterrupted by the positional feedback feature 40 so that none of the radiation is deflected when the radiation is directed through the central area 80 of the optical component. The pattern shown in FIG. 11 may provide more precise and accurate feedback information than the pattern shown in FIG. 12, which is better for selected zone control embodiments or useful for limited switch control.

One feature of the illustrated embodiments is that they allow for realizing a LIDAR (light detection and ranging) device 22 that is useful for automated vehicle applications. Each of the illustrated embodiments have various features that are not necessarily restricted to only the respective illustrated example but, instead, may be combined with one or more features of another illustrated embodiment to realize other embodiments that are not specifically illustrated.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for controlling a direction of radiation, the device comprising:
    a source of at least one beam of radiation;
    a plurality of optical components in a pathway of the at least one beam of radiation, the plurality of optical components establishing a first direction of the at least one beam of radiation, the plurality of optical components including at least one adjustable optical component that includes at least one portion that is moveable relative to the source;
    a positional feedback feature on a portion of at least one of the optical components, the positional feedback feature deflecting at least some of the at least one beam of radiation in a second direction that is different than the first direction, the positional feedback feature having a pattern that provides position feedback information in two dimensions; and
    a detector situated to detect at least some of the deflected radiation, the detector providing an output indicative of the first direction,
    wherein the positional feedback feature on the portion of the at least one of the optical components comprises at least one of
    a plurality of hemispherical deflecting surfaces,
    a nanoscale reflective surface,
    a nanoscale refractive surface, and
    a nanoscale grating.

2. The device of claim 1, comprising a controller that is configured to control movement of the portion of the at least one adjustable optical component based at least in part on the output of the detector.

3. The device of claim 1, wherein the positional feedback feature comprises a plurality of hemispherical deflecting surfaces arranged in a selected two-dimensional pattern on the at least one of the optical components.

4. The device of claim 1, wherein
    the plurality of optical components includes a microelectrical-mechanical (MEM) mirror array; and
    the output of the detector is indicative of a position of at least one of the mirrors of the array.

5. The device of claim 1, wherein
    the plurality of optical components includes at least one stationary optical component that remains stationary relative to the source; and
    the stationary optical component is at least one of a reflective surface, a refractive surface, a lens and a window.

6. The device of claim 1, wherein the radiation comprises light.

7. A method of monitoring a device that directs radiation, the device including a source of at least one beam of radiation, a plurality of optical components including at least one adjustable optical component that includes at least one portion that is moveable relative to the source, and a positional feedback feature on a portion of at least one of the optical components, the method comprising:
    establishing a first direction of the at least one beam of radiation including selectively positioning the portion of the at least one adjustable optical component;
    deflecting at least some of the at least one beam of radiation from the positional feedback feature in a second direction that is different than the first direction, wherein the positional feedback feature has a pattern that provides position feedback information in two dimensions;
    detecting at least some of the deflected radiation; and
    determining the first direction based on the detecting,
    wherein the positional feedback feature on the portion of the at least one of the optical components comprises at least one of
    a plurality of hemispherical deflecting surfaces,
    a nanoscale reflective surface,
    a nanoscale refractive surface, and
    a nanoscale grating.

8. The method of claim 7, comprising
    providing information regarding the detecting to a controller; and
    using the controller to control the position of the portion of the at least one adjustable optical component based at least in part on the information.

9. The method of claim 7, wherein the positional feedback feature comprises a plurality of hemispherical deflecting surfaces arranged in a two-dimensional pattern on the at least one of the optical components.

10. The method of claim 7, wherein
    the plurality of optical components includes a microelectrical-mechanical (MEM) mirror array; and
    the determining includes determining a position of at least one of the mirrors of the array.

11. The method of claim 7, wherein the radiation comprises light.

12. A LIDAR device for use on an automated vehicle, the device comprising:
    a source of at least one beam of light;
    a plurality of optical components in a pathway of the at least one beam of light, the plurality of optical components establishing a first direction of the at least one beam of light, the plurality of optical components including at least one adjustable optical component that includes at least one portion that is moveable relative to the source;

a positional feedback feature on a portion of at least one of the optical components, the positional feedback feature deflecting at least some of the at least one beam of light in a second direction that is different than the first direction, the positional feedback feature having a pattern that provides position feedback information in two dimensions; and a detector situated to detect at least some of the deflected light, the detector providing an output indicative of the first direction, wherein the positional feedback feature on the portion of the at least one of the optical components comprises at least one of a plurality of hemispherical deflecting surfaces, a nanoscale reflective surface, a nanoscale refractive surface, and a nanoscale grating.

13. The LIDAR device of claim 12, comprising a controller that is configured to control movement of the portion of the at least one adjustable optical component based at least in part on the output of the detector.

14. The device of claim 12, wherein the positional feedback feature comprises a two-dimensional pattern of hemispherical deflecting surfaces on the at least one of the optical components.

15. The device of claim 12, wherein the plurality of optical components includes a microelectrical-mechanical (MEM) mirror array; and the output of the detector is indicative of a position of at least one of the mirrors of the array.

* * * * *